Feb. 11, 1969 H. W. BURNEY 3,426,563
PEENING APPARATUS
Filed April 4, 1966 Sheet 6 of 8

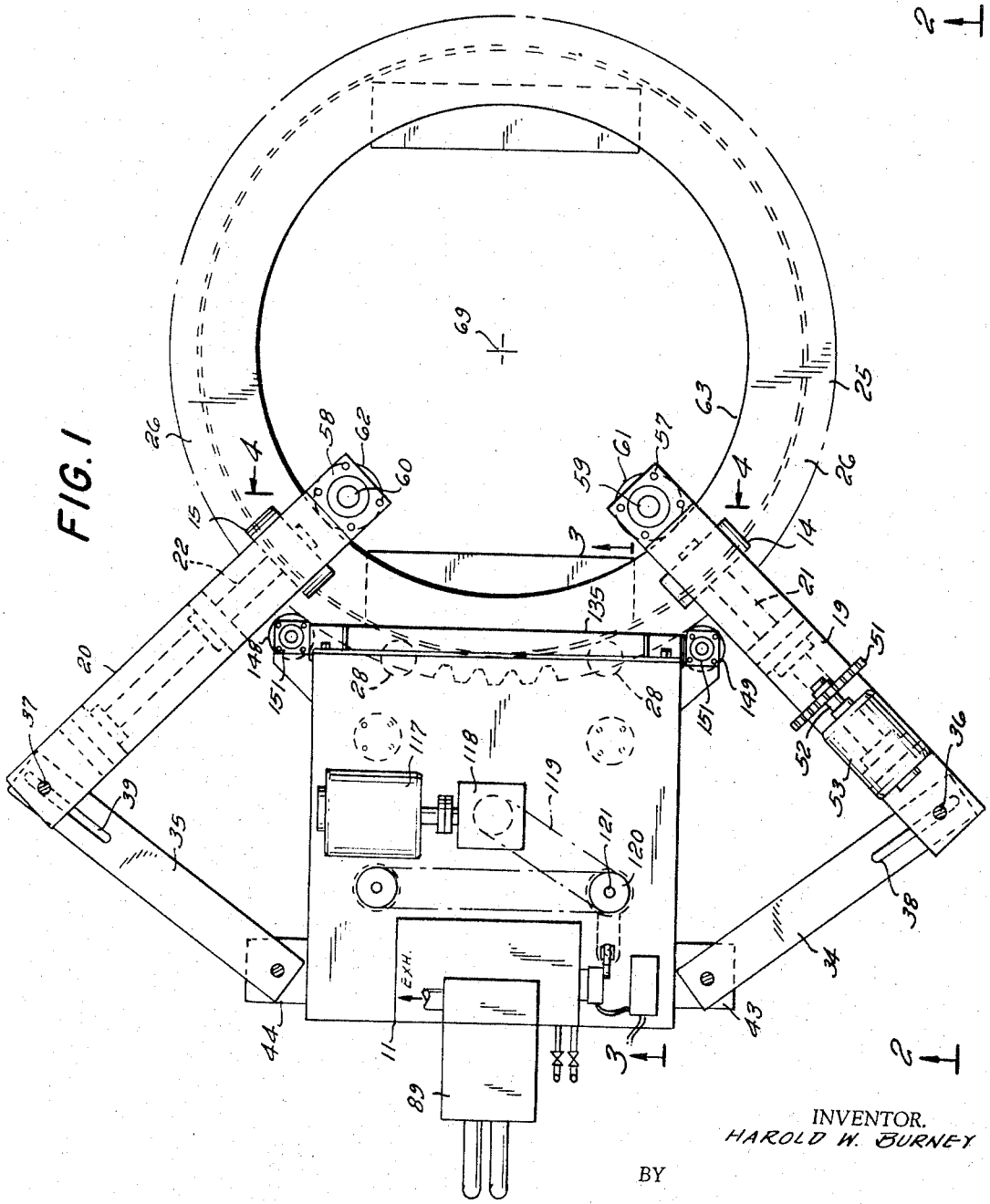

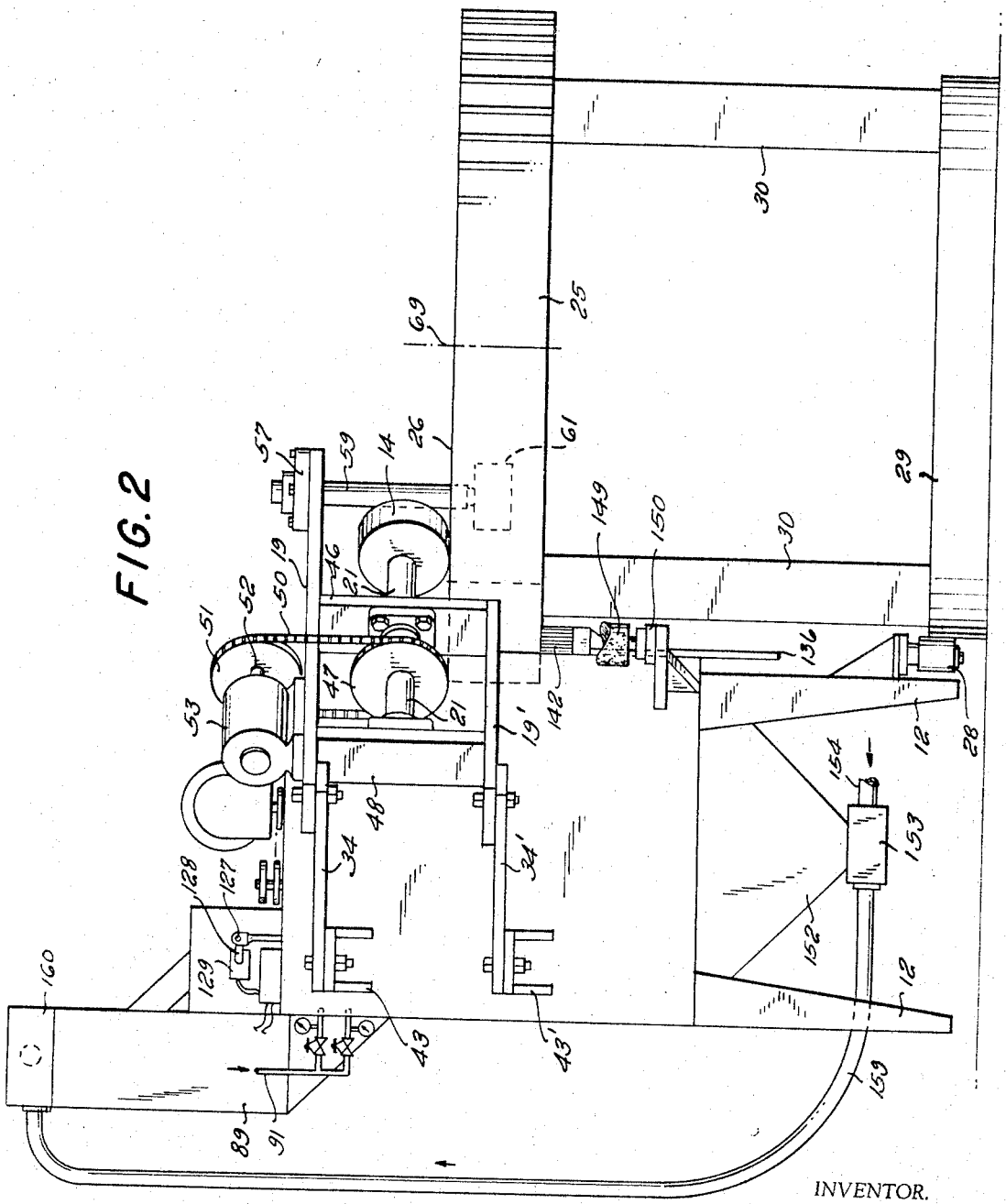

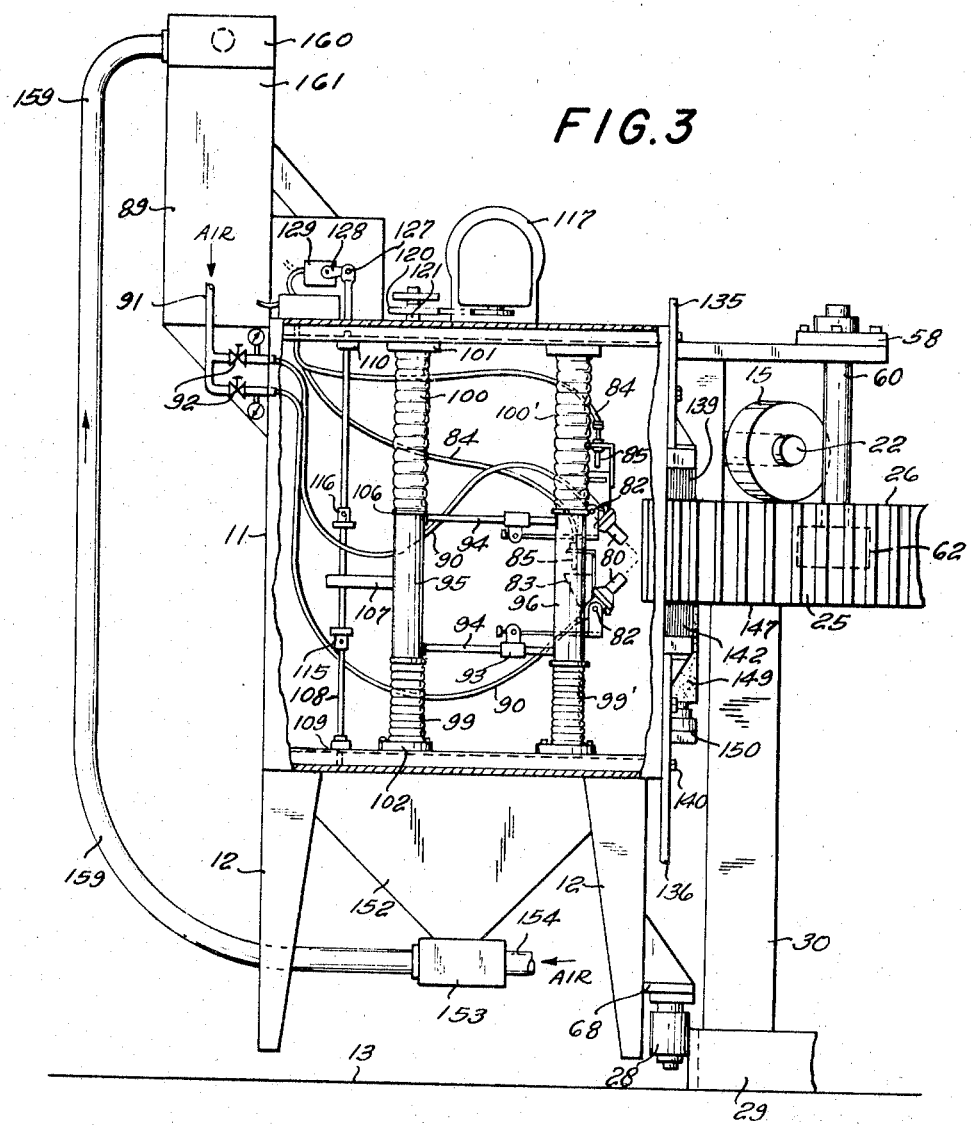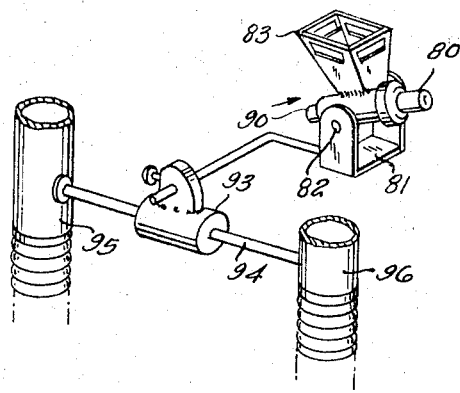

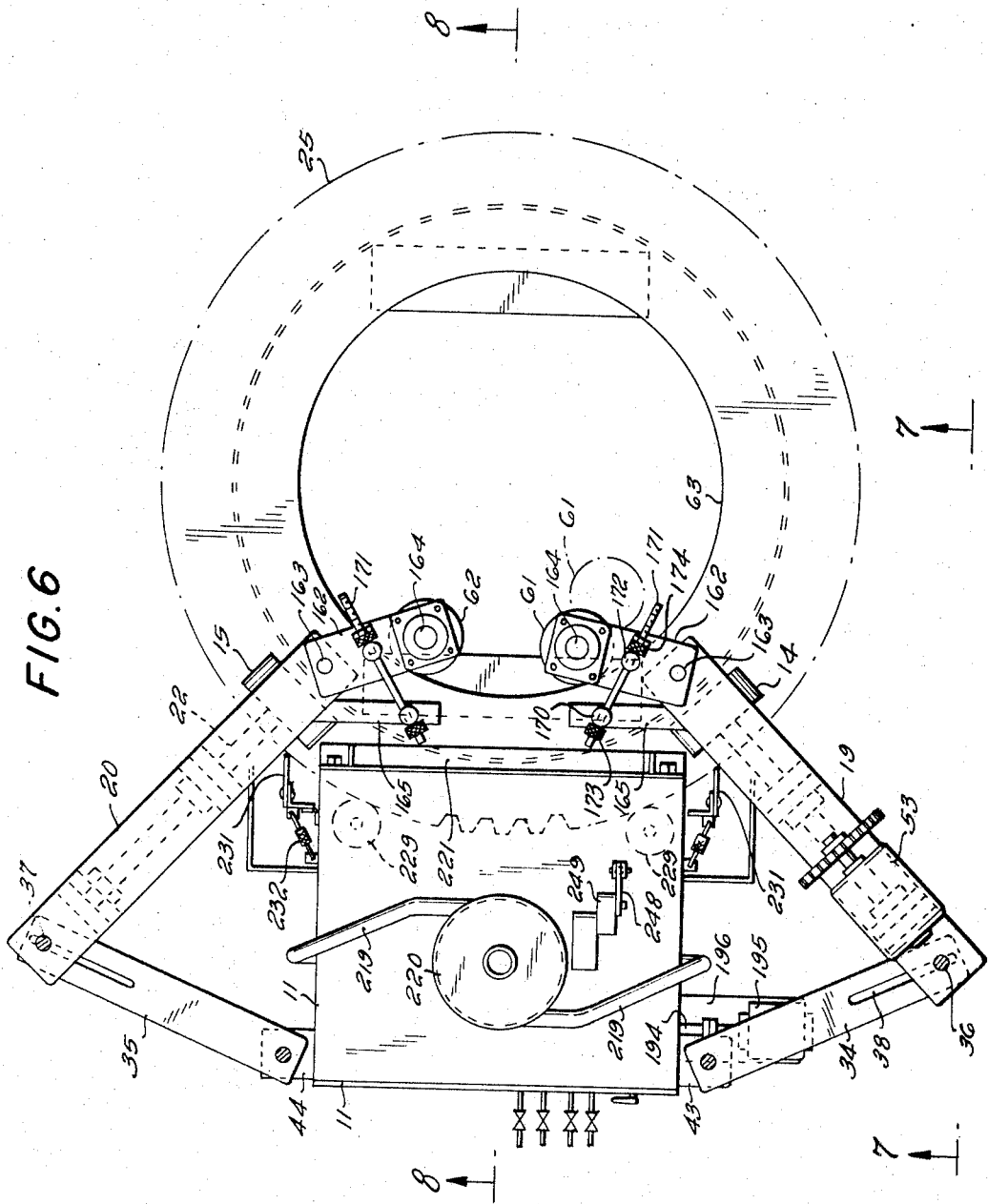

INVENTOR.
HAROLD W. BURNEY
BY
Kane, Dalsimer, Kane & Smith
ATTORNEYS

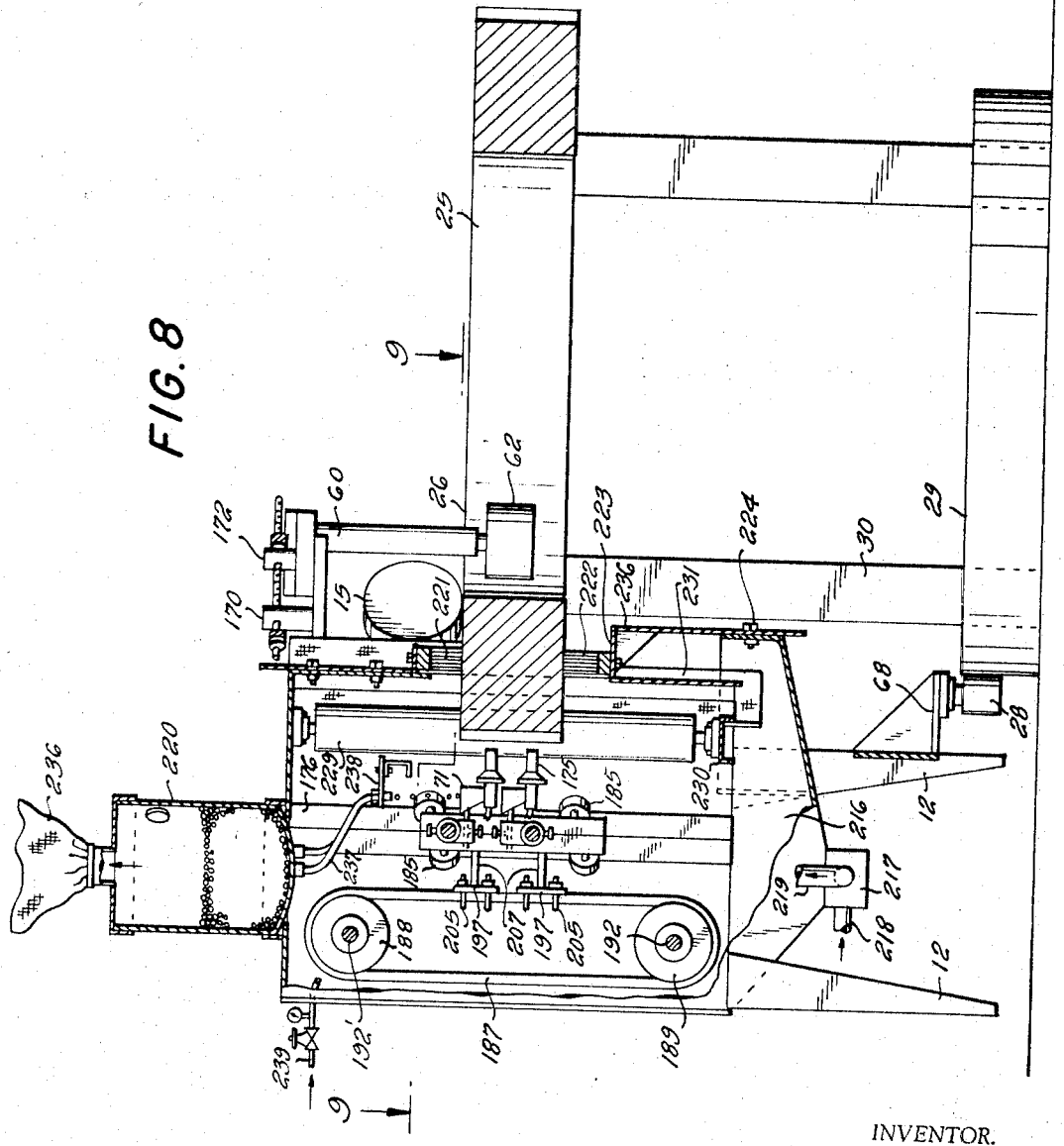

Feb. 11, 1969  H. W. BURNEY  3,426,563
PEENING APPARATUS
Filed April 4, 1966  Sheet 8 of 8

INVENTOR.
HAROLD W. BURNEY
BY
Kane, Dalsimer, Kane & Smith
ATTORNEYS

United States Patent Office 3,426,563
Patented Feb. 11, 1969

3,426,563
PEENING APPARATUS
Harold W. Burney, Hackensack, N.J., assignor to Metal Improvement Company, Carlstadt, N.J., a corporation of New Jersey
Filed Apr. 4, 1966, Ser. No. 539,933
U.S. Cl. 72—53                                                 15 Claims
Int. Cl. B21d *31/06;* B24b *1/00;* B24c *3/12*

ABSTRACT OF THE DISCLOSURE

This invention relates to peening apparatus which is particularly adapted for peening large size components. As a general proposition, the component is suitably supported in any desired fashion and relative motion between the peening device and the component is achieved usually by a movement of the peening apparatus about the component. The peening rig is adapted to be supported for rotational movement by being supported upon the component and gradually moved thereabout while shot are ejected against the component from selected nozzle units.

---

This invention relates to peening apparatus particularly adapted for peening large gears or other components of large size.

Peening devices, as is well known, incorporate elements adapted to eject small size shot, usually in the form of polished steel balls, at high velocity through a nozzle jet toward the component to be worked upon. The ejected shot is passed from the jet nozzle under the control of a driving fluid force which flows through the nozzle jet structure concurrently with the shot. The shot are supplied into the ejection jet structure from a suitable hopper or supply source. The shot feed into the jet structure proper from the hopper enters into a mixing chamber into which a fluid jet (usually air under relatively high pressure) is also passed. The mixing chamber leads to the jet nozzle so that the shot entering the mixing chamber from the rear is propelled outwardly by the fluid through the ejection jet nozzle in the direct path along which the ejection jet nozzle is faced. The flowing fluid stream passing through the mixing chamber toward the outlet jet under pressure tends to create somewhat of a vacuum in the mixing chamber to draw the shot from the feed hopper and thereby supplement the gravity feed normally to be expected.

This action tends to maintain the mixing chamber continually full of shot which are ejected, as above explained. In this respect, it is important that the fluid pressure should be held as constant as possible and that the supply head of the steel balls be uniform in order that the shot ejected from the work nozzle under force of the fluid shall impact the surface of the article to be peened with substantially uniform force at all times. The tendency of the impacting shot is to compress the immediately impacted surface and, in so doing, effectively to cold-work that surface, thereby to strengthen it.

A peening operation is frequently practiced upon the teeth of large gears following casting or machining in order to provide somewhat increased strength therein.

According to this invention, a peening rig which carries the supply of peening steel balls adapted to be ejected through the jet nozzle is arranged substantially adjacent to the work to be treated. At the same time that the peening balls are supplied to the outlet jet, provision is made for feeding fluid under high pressure also to the jet to act in the fashion already described. The peening rig which is positioned adjacent to the work to be treated is arranged so that relative movement between it and the work to be treated is achieved. In a preferred form, the peening rig is supported adjacent to the work, which will here be assumed to be the gear having spur teeth of any desired configuration about its periphery. In some cases, the gear or other work is adapted to be rotated relative to the peening rig, but it will here be assumed that it is usually better from the manufacturing standpoint and because of the large size and weight of the gear to turn the peening machine relative to the work. If the work to be handled is to be moved relative to a stationary machine, the work (which, illustratively, as above stated, may be a large gear) is frequently supported upon a large turntable and the peening rig is then brought adjacent to the work.

For either type of operation, a pair of guide arms extending outwardly from the rig provide a guide for the rig in its positioning relative to the work. Usually, for purposes of rapid alignment, a plurality of spaced guide means forming a part of the rig extend outwardly therefrom to bear upon the work. These form a two-point guide and provide stability of location although a third guide point is established by an additional guide element extending below the plane of the work which serves to locate the rig as a whole.

The peening rig includes mechanism to provide, if desired, multiple impacting jets which may be nested to provide additional impact force. The nested jets are then moved back and forth at a desired rate of reciprocation relative to the component to be peened. At the same time relative motion is provided between the rig and the component whereby the entire periphery of the component may be traversed by the shot-ejecting elements.

Provisions are made for recovering the shot subsequent to its impacting the surface of the component to be treated. The recovered shot is then returned to a supply bin or storage hopper where it is cleaned, if necessary, and then again supplied to the jet mechanism for ejection again under the fluid pressure action.

Various arrangements may be utilized for carrying out the aims and objectives of this invention. Each form seeks to provide a device which is efficient in use, which is easy and convenient to use, which can be transported between different locations for its operation and which can be assembled and operated at a reasonable price:

The invention has been illustrated in two of its preferred forms by the accompanying drawings, wherein:

FIG. 1 is a schematic plan view of one form of the apparatus;

FIG. 2 is a side elevation view looking approximately along the path indicated 2–2 on FIG. 1;

FIG. 3 is a partial sectional view in elevation of the apparatus of FIG. 1 looking in the direction shown by the arrows 3–3 on FIG. 1;

FIG. 5 is approximately an isometric view of the position control mechanism for determining the positioning and tilting of the nozzle jet used in the apparatus shown by FIGS. 1 through 4;

FIG. 6 is a to plan view, somewhat similar to FIG. 1, to show a modification of the FIG. 1 structure;

FIG. 8 is a partial sectional view (some parts broken away) of the apparatus of FIG. 6 looking in the direction of the arrows 8—8 in approximately the section between these arrows;

Figure 4:
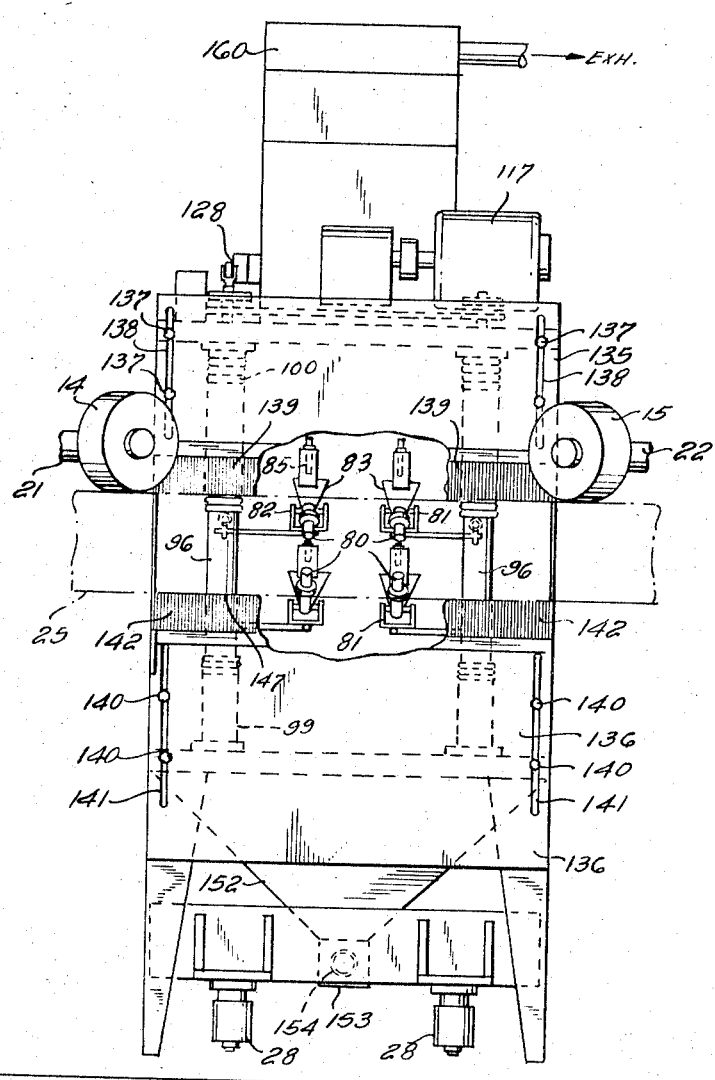
FIG. 4 is a front elevational view partially broken away looking from the plane shown in the direction 4—4 on FIG. 1.
Figure 7:
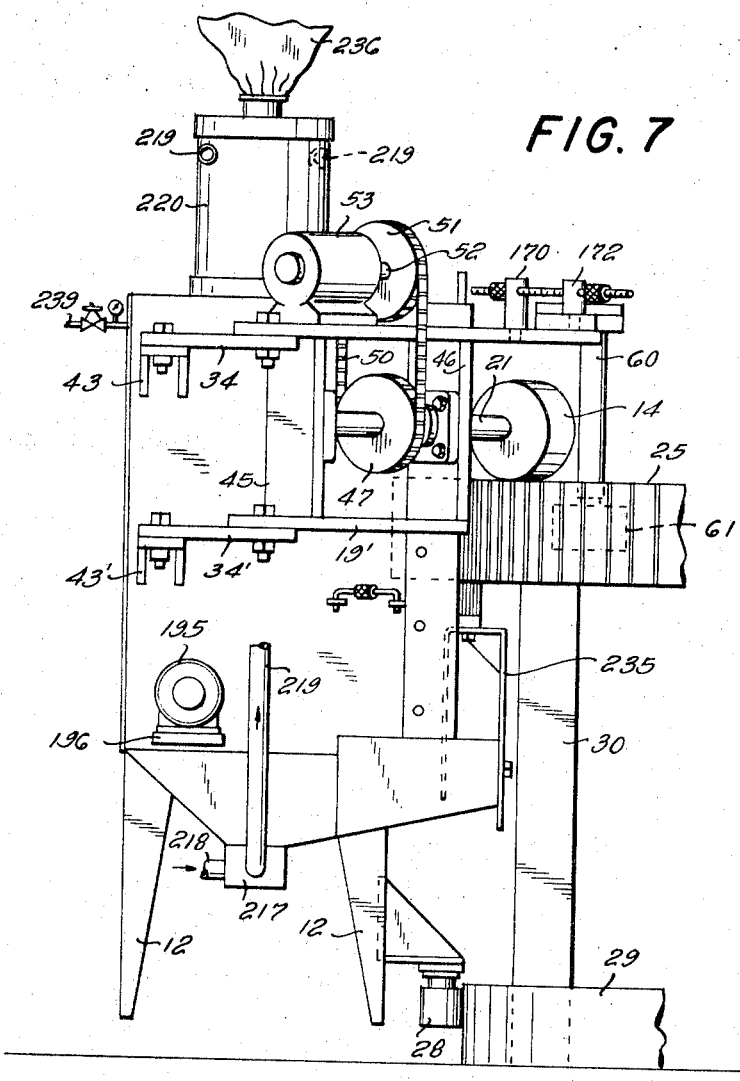
FIG. 7 is a side elevational view of the modification of FIG. 6 shown from the direction on FIG. 6 indicated by the arrows 7—7.

Referring now to the drawings for a further understanding of the invention and first to the form shown by the group of FIGS. 1 through 5, the peening rig is generally contained within a rig housing 11 within which the peening nozzle jets are supported. The housing 11 is formed with support legs 12 that in some instances are rested upon the schematically represented flooring 13 but which in many instances are held clear from the floor by support elements, such as the support rollers 14 and 15, which are carried from the housing at the outer end of laterally projecting arms 19 and 20. The arms are adapted to turn upon the shafts 21 and 22, later to be discussed. The support rollers 14 and 15 are adapted to rest upon the upper surface of the article or component to be peened. This article or component is here represented schematically and illustratively by the gear 25. It will hereafter be referred to broadly as a gear. The rollers 14 and 15 are supported upon the upper face 26 of this gear. Under such conditions, a complete peening rig housing 11 is supported with its support legs clear of the floor level. In these instances, stable positioning of the rig is also achieved by virtue of a pair of positioning rollers 28 which are adapted to rest and roll against a guide frame 29 which is rested upon the flooring 13 and which supports the work (here illustrated as the gear 25) above it by the support standards 30.

This form of the invention, as will be apparent from what is to follow, provides that the complete peening rig will be movable to turn around the gear to be peened, with the gear held in the stationary position. The gears or other components here under consideration are large and extremely heavy units. They are usually of a type and size used on tankers, destroyers, spillways, locks, submarines, aircraft carriers and the like. The size may vary, for instance, from a diameter of about 4 feet to as much as 16 to 18 feet. The gear face width can vary from a relatively few inches to wider gears of the order of 4 feet. The gears weigh in some instances as much as thirty tons so that it is of great importance and a factor necessary to economy that the apparatus shall faithfully and efficiently function.

The rollers 14 and 15, and the laterally projecting arms 19 and 20 supporting the rollers, are designed to carry substantially all the weight of the peening rig and the mechanism therewith associated. The arms 19 and 20 are pivotally connected to a pair of guide arms 34 and 35 by the pivot connections 36 and 37. The point of pivot connection is movable along each guide arm 34 or 35 within the guide slots 38 and 39 to aid in the final positioning of rollers 14 and 15. The guide arms 34 and 35 are hinged to brackets 43 and 44 which, in turn, are appropriately secured (as by welding) to the main frame members of the peening rig housing 11 (only schematically represented for the sake of clarity of overall illustration).

As can be seen particularly from FIG. 2, each of the guide arms 34 and 35 has a lower counterpart. here designated 34′ or 35′ for instance, which is secured to a similar bracket 43′ or 44′, as the case may be. The arms are beneath the laterally projecting arms 19 and 20. There is also a similar laterally projecting arm 19′ or 20′ for providing a lower support. The attachment or hinging of the laterally projecting arm 19 (or 20) to the guide arm 34′ (or 35′) is achieved in a fashion similar to that already expressed for the arms 19 and 34. Spacing between the outwardly projecting arms 19 and 19′ (or 20 and 20′) is maintained by a pair of spacing brackets 45 and 46, with similar brackets being provided for the arms on the opposite side of the rig housing.

The support rollers 14 and 15 are carried upon support shafts 21 and 22 which extend through bearings held by the spacing brackets 45 and 46 between the laterally projecting arms and the guide arms at both the inner and outer ends thereof. The rollers are carried at the outer ends of the supporting shafts and form a part of the mechanism for supporting the rig housing. The shaft member 21 is driven. The other shaft 20 is free-running and acts as a follower. Considering FIGS. 1 and 2 in particular, it can be seen that a sprocket gear 47 keyed to the shaft is connected by way of the drive chain 50 to an upper driving sprocket 51 which is carried on the shaft 52 of a motor and reduction gear combination 53 conventionally shown. The driving motor is preferably of either a carefully regulated variety, or a synchronous motor, since constant speed is of significant importance. Any appropriate gearing mechanism is adapted to rotate the roller 14. The rollers which carry the weight of the rig 11 bear frictionally upon the upper surface of the gear surface 26. With roller 14 being a driven element it provides the necessary gear rotation. The gearing is established in such a ratio with respect to the motor speed that the drive from the motor 53 through the bearing and chain drive to the support shaft 21 and the roller 14 causes the work or the gear 25 to rotate at the desired constant speed (usually very slowly) relative to the stationary rig housing. The support roller 15 also bears against the upper face 26 of the gear and rotates about the shaft 22. It is usually not a driven roller.

The laterally projecting arms 19 and 20 normally carry a bearing member 57 or 58 at the outer end. A shaft 59 or 60 is firmly supported in the bearing, as indicated, and each shaft carries at its lower end an idler roller 61 or 62. The idler rollers 61 and 62 are adapted to fit adjacent to the inner face of the work (here illustrated as a gear) upon which the support rollers 14 and 15 are supported. These idler rollers when rested upon the inner surface 63 of the gear thereby serve as further guide and positioning elements for the peening apparatus contained within the rig housing 11 relative to the work to be peened, although they do not carry the weight of the unit.

At this point, it may be emphasized again that the gear 25 which is here assumed to be worked upon and which has the gear teeth, conventionally shown at 67, on the outer periphery is usually a large and heavy component.

To be worked upon, the gear is normally and customarily elevated upon the support standards 30 completely independently of the peening rig which is at a later time supported therefrom. When the gear 25 is positioned upon the support standards 30 and its guideframe 29, the peening rig housing 11 then can be picked up by any appropriate form of hoist or crane (not shown) and carried or transported laterally until the support rollers 14 and 15 are above the upper flat face 26 of the gear 25 and the idler rollers 61 and 62 are internally positioned relative to it. At this time, the positioning rollers 28 which are carried by the indicated brackets 68 from the support legs 12 of the rig housing 11 are brought to a position adjacent to the edge of the guideframe 29. Some slight modification of the positioning is provided by reason of the mounting of the laterally projecting arms 19 and 20 being pivotally moved relative to the guide arms 34, 34′ or 35, 35′, as the case may be.

It is usually also desirable at this point in positioning the rig housing 11 to adjust the positioning of the pivot connections 36 and 37 prior to fastening and locking together the guide arms 34, 34′ or 35, 35′ to the laterally projecting arms 19 or 20. The tightening of the position of the pivot connection 36 or 37 is usually established by arranging the shafts 21 or 22 within the laterally projecting arms in such fashion that they are radially located relative to the assumed center 69 of the gear 25. Thus, the assumed projection of the shaft axes would intersect at the center of the work to be peened. With the established location of the idler rollers 61 and 62 against the interior of the gear to be peened and the support rollers 14 and 15 adjacent to the upper surface of the gear and the positioning roller 28 adjacent to the guideframe 29, the hoist positioning the peening rig housing 11 may now be removed because the rig housing is adequately held in a sufficiently secure fashion to the work. In this position, the peening operation can be instituted. In so doing, the peening is provided by the ejection of ball shot, usually in the nature of small steel balls having a diameter in the range between about 0.007″ and 0.25″, which shot are then forced from the nozzle jets under the influence of a fluid stream of relatively high pressure. Various fluid pressures may be used but the usual range is from slightly above atmospheric to values of the range of 125 p.s.i.g., or more.

The peening jets are normally of a type wherein the shot are usually adapted to feed gravitationally into a mixing chamber into which fluid under pressure is supplied. The fluid (usually air) forces the shot from the mixing chamber outwardly through a nozzle jet from which it is projected toward the work to be peened. Various forms of nozzle structures may be utilized including among which is that described in an application for Letters Patent filed by this inventor jointly with Fred K. Landecker on Apr. 1, 1966; as Ser. No. 539,431; under the title Peening Nozzle.

While the type of nozzle specifically shown in the said application last named is desirable, it will be understood that for the purpose of this disclosure any type of nozzle and jet having the general characteristics above outlined is suitable.

Figure 11:
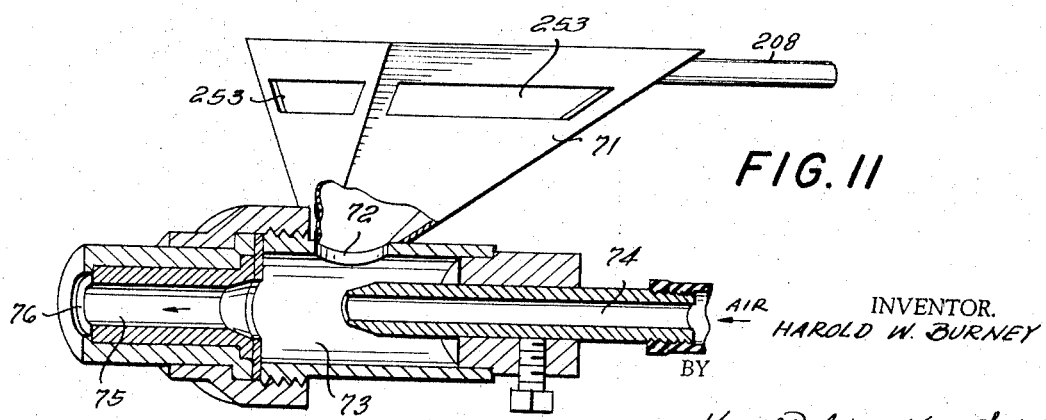
FIG. 11 is a view of a nozzle structure with its feed hopper providing a substantially constant head of shot to be ejected therefrom toward the component being treated.

It is important, however, that the ejected shot as projected through the nozzle jet shall impact the work (in the assumed instance the spur gear teeth of the gear element 25) at approximately the same velocity and with the same shot quantity or density regardless of the portion of the gear being treated. To this end, there is schematically represented, particularly by FIG. 11, later to be additionally discussed, a form of nozzle of the general character set out by the mentioned concurrently filed application of this inventor. Suffice it at this point to state that the shot are supplied to a hopper 71 which has an outlet port 72 leading into a mixing chamber 73 of the nozzle jet apparatus as a whole. Fluid (from any desired source) under pressure is introduced into the mixing chamber through the fluid inlet tube 74 which terminates within the mixing chamber and generally just slightly ahead of the center of the outlet port 72 from the hopper. The shot which collects within the mixing chamber generally flows gravitationally from the hopper and should preferably have about the same head regardless of the position of the nozzle jet so that the rate and quantity of flowing shot will be held substantially constant. An outlet port or tube 75 forms the nozzle jet and is arranged to enter the mixing chamber substantially axially aligned with the tubular fluid inlet tube 74. The fluid and shot leave the nozzle jet along the edge 76 and impinge upon any objects within their direct path.

Referring again now to the group of FIGS. 1 through 4 and particultrly to FIGS. 3 and 4, several nozzle jets, all designated 80, are carried upon a bracket support 81 about which the nozzles as a whole may be pivoted, as at 82. Each nozzle has a hopper 83 associated therewith. The ball shot are fed into the hopper by any suitable feed device, such as the tube 84 which terminates in an outlet 85 immediately above the hopper. A stream of shot is fed into the tube element 84 from any desired storage region, such as the conventionally represented storage hopper 89. The shot flow out of the storage hopper through the feed tubes 84 and into the nozzle jet hoppers 83. At the same time, inlet fluid under pressure is supplied through inlet tubes 90 from a source (not shown) connected to inlet 91 and supplying the tubes through the schematically designed inlet valves 92 which control the fluid quantity and pressure which reaches the jets. The lateral positioning of the jets, as schematically shown by FIG. 5, is determined by the positioning of the bracket or support 81 which is held within a support collar 93 carried upon a spindle 94 extending between tubular bracket sleeves 95 and 96 which are adapted to move up and down the interior of the rig housing 11. The bracket sleeves are arranged to surround a threaded member (not shown) of any well known character contained within a pair of boot members 99 and 100, the ends of which are preferably free from threading and are carried in upper and lower bearing members 101 and 102 respectively. At the top of the sleeve 95, for instance, there is a closure plate member schematically shown at 106 having an internal threading such that if the threaded spindle within the boots 99 and 100 is rotated, the threading will cause the plate 106 (and with it the sleeve 95) to move up or down depending upon the direction of rotation of the threaded spindle since the plate 106 is in fixed position longitudinally of the spindle. The spindle (not shown) inside the sleeve 96 and the covering boots 99′ and 100′ need not be threaded since the movement up and down is controlled by the movement of sleeve 95. To achieve this movement the spindle members 94, as can be seen particularly from FIG. 5, are attached at their ends to the sleeves 95 and 96 so that with movement of the sleeves up or down due to rotation of the threaded spindle contanied within the boots 99 and 100 and carried in the bearings 101 and 102, the spindles 94 which carry the guide element and support for the nozzle jets will likewise move up and down. The boot coverings 99 and 100, or 99′ and 100′, are compressed and expanded as the associated sleeves move up and down. The coverings preclude the dust from the peening operation from collecting in the threads of the drive spindles and, accordingly, make the up and down movement easily attained.

An additional bracket 107 is arranged to move with the sleeve 95. The bracket has a central opening (not shown) which surrounds a shaft or guide spindle 108 that is arranged for slidable movement up and down through a limited range through the guide bearings 109 and 110. There is positioned about the spindle 108 and with calculated spacings a pair of collars 115 and 116. These collars are spaced apart from each other to control and limit the up and down movement. Each collar is locked to the spindle by a suitable set screw so that the spacing of the collars approximates the transverse width of the gear face which is to be peened. The rotation of the spindles contained within the boots 99 and 100 causes the sleeves 95 and 96 to move up and down and with them the spindle 94 moves similarly to provide the nozzle jets with an upward and downward motion determined by the movement of the bracket relative to the collars 115 and 116.

The threaded spindle supported in the bearings 101 and 102 and carried within the boots 99, 100 is driven in any desired fashion by way of a drive motor schematically shown at 117 and driving through a gear reduction 118 to turn through an appropriate belt drive, or the equivalent 119′, pulley 120 which is keyed to the heretofore identified but not numbered threaded shaft 121. Rotation of the motor in either a clockwise or a counterclockwise direction, depending upon the direction of threading of the threaded shaft 121, determines whether the bracket 107 moves up or down with the shaft rotation in one direction or the other. With the bracket moving up, for instance, upward movement to contact the collar 116 tends to lift the guide spindle 108 and move it upwardly and through the pivotal connection made at 127 to an arm 128. The conventionally represented switch element 129 will control the motor 117. Following the upward movement of the collar 116 the motor circuit is controlled to change its direction of rotation, in which event, the threaded spindle 121 will then turn in the opposite direction and the sleeve 95 will move downwardly until the bracket 107 contacts the collar 115 to move the switch arm downwardly and again reverse the motor. If desired, the lever arm 128 may serve to change gearing instead of to move a reversing switch 129. The desire is merely that of changing the direction of rotation of the threaded spindle 129.

The spindle rotation has the effect of moving the sleeves 95 and 96 up and down due to their connection through the sleeve 94 which, as already indicated, moves freely about its support shaft. With the movement up and down, the nozzle jet 80, carried from spindles 94, likewise move up and down across the face of the gear. As the jets have been shown, they are positioned with the nozzles aligned in sets of two with each two nozzles tending to impact substantially a single point. Various other arrangements of the jets may be provided. In some instances, it is desirable to modify the jet arrangement so that with a group of four, as shown particularly by FIGS. 3 and 4, all of the jets may be nested to direct the ejected shot substantially to one main point so that as the jets move up and down, the released shot from all jets will strike substantially a single point on the gear face at any one time, then to be moved up and down across the gear face with the gear being turned under the influence of the driving support roller 14. With the gear being continually turned relative to the jets, all tooth area of the gear is finally and appropriately peened.

The shot which are directed toward the work, here shown in the form of a gear face, after impacting the face, are gathered for recirculation. For this purpose, the side of the rig housing which faces toward the work would normally be open except for the use of an upper and lower closing panels 135, 136. While it has not been shown for the sake of clarity, the rig housing 11 is normally formed with supporting braces, particularly side and corner braces, to which suitable sheet metal sides are secured. In the case of the corners, such supports are normally long angle iron members or the equivalent to which the metal paneling can be readily attached. In the case of the front side of the housing which would normally be open, the upper panel 135 is preferably attached by a plurality of fastening bolts 137 which pass through a slotted section 138 on each side of the panel 135. The upper panel 135 is normally fixed in position because the drive and follower rollers 14 and 15 are held at a fixed distance below the laterally projecting arms 19 and 20. Therefore, it is normally desirable to close the upper portion of the rig housing to the extent indicated. In order that there may be a closure, a suitable brush element 139 is secured to the lower edge of the panel 135 with the brush bristles adapted to span the edge of the gear for the width of the rig housing 11. The brush and its bristles with the panel 135 accordingly close off the upper section of the rig housing.

Similarly, to close off the bottom section, the panel 136, which covers the front lower portion of the rig housing, is likewise held to the corner frame members of the housing by suitable fastening bolts 140. A slot member 141 is formed on each side of the lower panel 136 and the bolts pass therethrough, permitting the panel section to be moved up and down to a limited extent, depending upon the width of the work in the form of the gear 25. As was the case with the upper surface of the gear, it is desirable also to provide a brush to bear against the lower gear surface and, similar to the arrangement with respect to the upper panel 135, a brush member 142 spans the width of the rig housing 11 and the panel 136 in contact with the lower surface of the gear 147. With the adjustment of the lower closing panel 136 and the brush, the complete rig housing may be closed off vertically.

Lateral closure of the rig housing is also important. For this purpose, vertical rollers or brushes are provided substantially adjacent to each vertical edge of the front panel members 135 and 136. These rollers or brushes are shown at 148 and 149 and extend for a substantial part of the housing height. They are elongated members extending in a vertical direction. They are supported in bearings 150 at their lower end and bearing 151 at their upper end. The rollers or brushes then fit in tightly to roll against the gear face as the operation continues. The overall effect is that the front of the rig housing is closed by a combination of panel members which are movable up and down to bring them substantially adjacent to the top and bottom of the gear surface except for the fact that the final closure is made by the brushes and then the lateral closure is provided by the vertical brushes or rollers which are mounted on the bearings extending outwardly from the edge of the rig housing, as shown. With this arrangement, any shot which may be directed against the gear face is redirected back into the housing itself after impact. This redirected shot then falls downwardly through the housing into a collector bin 152 which leads into a mixing chamber. An inlet passage 154 is provided through which fluid (usually air) under relatively high pressure is supplied. This air forces the heretofore used shot into an outlet tube 159 which leads upwardly into the schematically represented air shot separator 160. The shot after entering the air shot separator then pass through a conditioner of any desired type to remove dirt and the like and are then passed into the storage hopper 89 from which it is reused. Various ways of recirculating the used shot may be utilized and while a pneumatic elevator arrangement is here given by way of the tubular lift 159, this may or may not be the most workable method for all installations. In general, any modified feed form may be instituted.

The drive means provided by the motor 53 and its reduction gearing used for driving the support roller 14 is started at the commencement of the peening operation after the gear is positioned adjacent to the rig housing 11, with the upper and lower panels 135 and 136 moved to close in over the gear, considering, of course, that the brushes 139 and 142 are then actually positioned to sweep the gear top and bottom and brushes 148 and 149 are also adjacent to the gear surface. This drive operation rotates the gear relative to the rig housing. The operation is continued in this fashion described until the gear turns through at least 360° and has been peened completely. While the gear rotation is progressing the motor for providing the up and down reciprocation of the jet nozzles also operates substantially continuously, excepting for the fact that with each step of movement of the jet nozzles to an uppermost or a lowermost position, the set collars 115, 116 on the spindle 103 control the switch 129 to change the direction of motor rotation or to change a gear setting, as desired, in order that the threaded shaft 121 may turn in one direction or the other and thereby function, as already explained, to control the nozzle position by driving the sleeves 95 up and down.

The structure shown by FIGS. 6, 7, 8 and 9 provides a slightly modified arrangement, particularly with respect to the drive and movement of the nozzle jets relative to the work to be peened. Further provisions are made whereby the positioning rollers adapted to bear against the inner face of the gear may be adjusted more readily to take into account different gear widths. In this respect, it is to be understood that the gears are usually of annular shape in order to reduce the weight. There usually is a generally spider-type mounting support extending inwardly from the inner rim surface. This provides supporting arms for mounting the gear structure upon the drive or driven shaft.

Considering now the structure shown by FIGS. 6 through 9, similar identification numbers will be used throughout where possible. Making reference first to FIG. 6, the rig housing 11 contains the drive mechanism for moving the nozzle jets up and down transversely of the gear face. As already explained for the structure of FIGS. 1 to 4, provision is made by virtue of the drive roller 14 and follower 15 for turning the peening rig housing 11 relative to the gear component during the peening operation. As the invention is illustrated, it is assumed that the peening apparatus will be rotated relative to the gear during operation. This will move all nozzle jets contained within the rig housing around the gear face. The driving and rotation of the peening rig 11 about the gear 25 is provided by the drive roller 14 driven from the motor and reduction gear combination 53, as already explained. In a manner like that explained with respect to the showing of FIGS. 1 through 4, the gear element whose gear teeth are to be peened is first mounted upon a support stand or rack 30 having the base guide frame 29 which is adapted to be rested upon the floor. With the gear supported and lifted into place in any appropriate manner, as by a crane (not shown) the peening rig 11 is then also lifted into a position adjacent to the gear face in the manner already explained. The peening rig 11 is lowered upon the gear until its drive roller 14 and the follower roller 15 rest upon the upper side of the gear. At this time, the inner idler rollers 61 and 62 are moved to a position generally adjacent to the inner surface 63 of the gear. Some gears are of different widths than others and in order to provide a preferred alignment of the driving rollers 14 and 15, which are carried upon the laterally projecting arms 19 and 20, it is desirable to provide for adjusting and positioning the idler rollers 61 and 62. The positioning of the idler rollers is achieved through a pivotally mounted support block 162 carried on the forward end of the laterally projecting arms and capable of being turned relative thereto about the support and guide spindles 163. The rollers 61 and 62 in this instance are held in a bearing mounting 164 at the forward end of each support block 162 to be capable of rotating in any desired fashion.

A bracket member 165 extends inwardly from the outer end of each of the laterally projecting arms 19 and 20. There is a stud 170 at its outer end through which a rod 171 is passed. A similar type of stud 172 is positioned about centrally of the support block 162. The rod 171 passes through each of the studs 170 and 172 and is held by collars 173 and 174 which are brought tightly adjacent to the studs 170 and 172 in such position that the idler roller 61 is brought to bear against the inner face of the gear. One outer end of the rod 171 is usually threaded, as indicated, in order that the collar 174 may be tightened more readily to the stud and to preclude loosening of the collar with wear. Further, the tightening arrangement provides a ready release of the roller from the internal gear face at times when the peening of each gear is completed and it is desired to position other work adjacent to the rig housing. The laterally projecting arms 19 and 20 are supported, as already discussed in connection with the preceding figures, to extend from positions outwardly of the rig housing. The adjacent slots 38 make possible a movement of the arms in such fashion that the drive shafts supported therein are aligned with their axes passing substantially through the center of the supported gear. This makes it possible for drive roller 14 to turn the gear without any lateral slippage.

Figure 10:
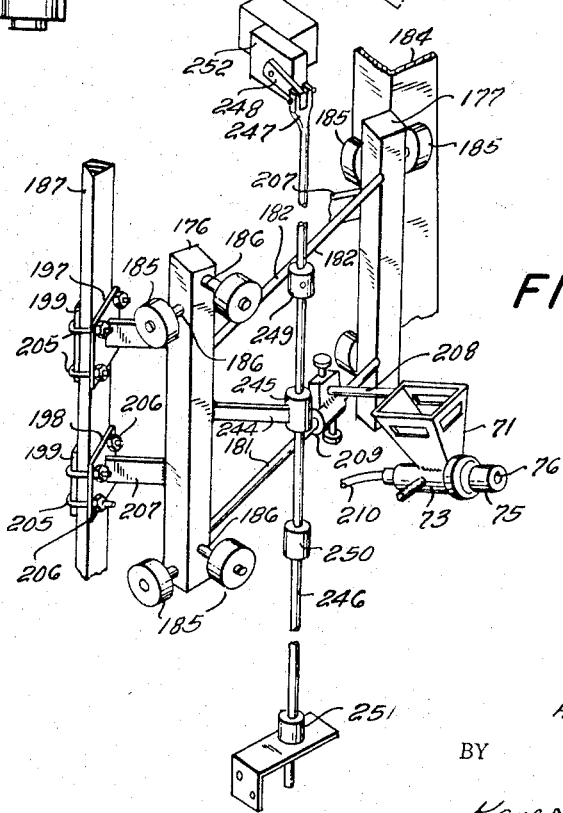
FIG. 10 is a generally isometric view showing a preferred form of nozzle jet raising and lowering control mechanism.

The peening rig comprising a multiplicity of jet nozzle elements 175 is carried upon a framework having two end support members 176 and 177 connected in any desired fashion by means of cross members or a cross panel, as desired. For convenience of illustration, FIG. 10 provides an arrangement of a plurality of cross members 181 and 182 connected between the end supports 176 and 177 thereby to maintatin a fixed spacing and support. For convenience of structural formation, the end support members 176 and 177 usually generally square in cross section although this is not an essential feature and they are elongated as shown more particularly by FIG. 10. Guide members 183 and 184 are carried in any desired fashion from the side walls of the rig housing 11 and extend for a substantial portion between the top and bottom of the housing. Roller members 185 are carried upon shafts 186 extending outwardly from the top and bottom regions of the end supports 176 and 177. The axis of each shaft extending from the end supports 176 and 177 is in a direction such that the supported rollers 185 rest upon the outer surface of each of the guides 183, 184 which provide a track along which the support and its cross braces may move up and down when the path of motion is controlled. Motion of the support frame is controlled by the movement of the belts 187 adapted to be positioned over upper and lower pulley elements 188 and 189 that are carried at each end of lower and upper connecting shafts 192 and 192'. The lower shaft has one end mounted in a bearing 193 at one side of the rig housing 11 and the other end mounted in a bearing 194. The shaft 192 which connects through the bearing 194 leads into the schematically represented gear box and motor combination 195 carried upon a support plate 196 extending outwardly and laterally from the rig housing. The upper shafts 192' are follower shafts and are held in bearings (not shown) similar to bearings 193. The drive provided through the motor and gear box 195 turns the lower drive shaft 192 and with it the lower pulley members 189 keyed thereto and constituting the driving medium for the belt 187.

It is usually desirable to provide the belt 187 as a generally V-shaped member fitting tightly into the pulley groove and thence over the upper pulley for driving purposes. One flat side of the V-shaped belt 187 is supported and clamped adjacent to bracket plates 197 and 198 to provide the jet nozzle driving effect. There is a recessed plate member 199 on the opposite side of the belt from the bracket plates 197 or 198. A U-shaped connector 205 is wrapped around each recessed plate 199 and extends through holes in the bracket plates 197. Each U-shaped connector is preferably threaded at its outer ends and after wrapping around the recessed plates 199 and the belt, the U-shaped connector is tightened about the combination by a fastening nut 206, or the equivalent, thereby to clamp the bracket plates tightly to the belt. Accordingly, any movement of the belt in an up or down direction carries with it each of the bracket plates 197, 198. A connecting arm 207 extends outwardly from each bracket plate and is secured in any desired fashion to one of the end supports 176 or 177 thereby to move the end supports up and down with any movement of the V-shaped belt resulting from rotation of the driving pulleys 187. The end supports 176, 177 and the connecting cross members 182 form the assembly into a frame adapted to hold and position a plurality of nozzle jets. The nozzle jets are supported in a manner generally similar to the support provided by the sleeve members 95 and 96 as shown particularly by FIGS. 3 and 4. Any number of nozzle jets may be carried upon the support frame.

Figure 9:
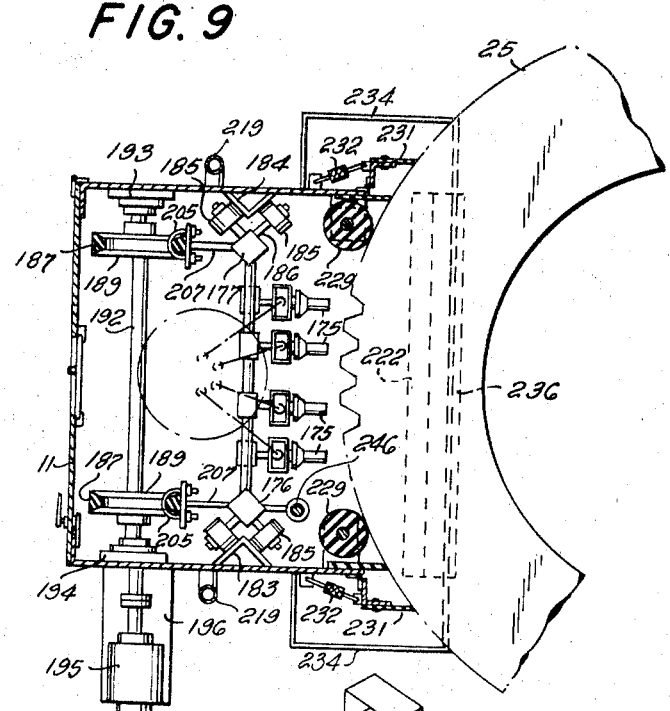
FIG. 9 is a sectional view taken along the line 9—9 of FIG. 8 looking in the direction of the arrows.

For the purpose of providing a source of peening shot to be directed toward any gear element held and supported relative to the peening rig housing 11 (conventionally represented by FIG. 9) a plurality of such nozzle jets are held by the cross members 181 or 182. For convenience of illustration in FIG. 9, the jets have been shown laterally spaced and separate but it is to be understood that the nozzle jets may be pointed inwardly, and arranged displaced from each other or in vertical alignment, as desired. The structure described provides a conventional means for mounting two nozzle jets on the lower cross member 181 and two additional nozzle jets on the upper cross member 182. As shown by FIGS. 8 and 9, the jets all appear to be pointed in the same direction but this again is merely for convenience in showing. Any suitable support may be provided for the nozzle jets which illustratively may be of the general type already described and shown more particularly by FIG. 11. It is convenient, however, to provide a bracket 208 which may connect to the nozzle jet hopper 71 for holding it. The bracket is securely positioned in a collar and clamp assembly 209 and held tightly to the cross member 181. A similar construction may be used for the upper nozzle jets. As was explained by reference already made to the nozzle jet construction, air or fluid under pressure may be introduced into the nozzle jet by way of an inlet tube 210 leading into the mixing chamber such as that shown at 73 on FIG. 11. The shot for peening are introduced into the hopper 71 and ejected through the opening or orifice 76 of the nozzle jet 75.

Following the peening operation, the used shot fall by gravity into a collecting bin 216 having sloping sides and leading into a small mixing chamber 217. As in the previously discussed modification, air under pressure is supplied by way of the inlet tube 218 thereby to force any shot that may be collected in the mixing chamber 217 upwardly through the hydraulic elevator tube 219. The tube 219 leads into an upper supply bin 220.

As was the case with the previously discussed modification, the shot after impacting the gear in the peening rig and being returned must be precluded from being forced outward at any other point than the collecting bin 216 and, further, provision must be made, as in the previously discussed modification, for avoiding any escape of dust or dirt resulting from the operation. To this end, the upper brush 221 is mounted in substantially the same fashion as already described with respect to FIG. 3. The lower brush 222 is supported from a brush support plate 223 extending upwardly from the collecting bin 220. This forward extension 223 is adjustable up and down by a slotted connection fastened by the pin 224. A pair of vertical rollers 229 is supported at either end from the upper surface of the peening rig and from the lower bracket member 230. The rollers (see FIGS. 6 and 8) rest against the gear surface and form a partial closure member for the peening rig housing. However, because of working with the gear teeth, at times complete closure from dust is not obtained by the rollers alone. To aid in the matter, baffle elements 231 extend outwardly from the wall of the peening rig to contact the gear surface. These baffle elements are adjustable in and out by means of the indicated turnbuckle element shown at 232 thereby to turn the elements about the fastening point to the wall of the housing until they contact the gear surface. These elements usually extend from the top of the housing 11 to the top of the collecting bin 216. The collecting bin 216 extends outwardly from the sides of the peening rig, as indicated particularly by its side walls 234 (see FIG. 9) in order to accommodate the baffle. For this reason, and in order to avoid open spaces, the upwardly extending and movable front wall of the housing bends to form the brush support 223 and then to form the forward section 235 which is adjustable up and down in the same fashion as the adjustable forward wall element 136 in FIG. 3. The shot, after having been forced up from the mixing chamber 217 by air pressure at the inlet 218 enters the upper supply bin 220. The shot are at this point usually accompanied by some dirt which is then carried upwardly into the porous bag member 236 through which the air from the tube 219 is able to escape. The dirt then is held under air pressure of the porous bag, and, upon completion of the operation, the bag merely collapses and holds the dirt in much the same fashion as does a collecting bag of a vacuum cleaner device. The shot which have been returned to the upper supply bin are then withdrawn therefrom by way of the indicated outlet connections 237 which terminate at support brackets 238 immediately above the hoppers 71 which feed the jet nozzles. The inlet fluid to the inlet tube 74 of the jet nozzle is supplied through an inlet tube 239 which leads to the indicated connection 210.

With the start of the operation, the motor gear box combination 195 is energized and immediately drives the V-belt 187 at an appropriate speed up or down to permit the gear surface carefully to be peened. The movement of the end supports 176 and 177 together with the connecting cross members 181, 182 which hold the jet nozzles also carries with it a support bracket 244 which is attached upon one of the end supports 176. The bracket 244 terminates in a tubular collar element 245 which fits loosely about a control rod 246. The rod 246 terminates at its upper end in a yoke 247 secured to a lever arm 248. A pair of collars 249 and 250 fastened to the control rod 246 at selected spaced positions, determined by the desired length of up or down strokes of the nozzles, establish the movement of rod 246 to establish drive direction when they are contacted by collar 245. As the support for the nozzle jets is raised and lowered, the tubular collar 241 comes into contact with either the upper or the lower collars 249 or 250, as the case may be. The control rod 246 is loosely supported at its lower end in a bushing 251 supported from the lower portion of the peening rig housing to slide therethrough. Upward movement of the tubular collar 245 when contacting the upper collar 249 raises the lever arm 248 and operates thereby a limit switch (not shown) contained within the control block 252 to reverse the drive motor and gearing 195 thereby to change the direction of belt movement. Similarly, a downward motion of the collar 245 striking the lower collar 250 then forces the control rod downwardly to pull the lever 248 down and again reverse the motor or reverse the gearing to change the belt direction. The limit controls accordingly start the jet nozzles provided for peening in either an up or down direction. This occurs during the rotation of the gear provided by the drive roller 14.

The jet nozzle constructions may be of various types and forms but it is important that the head of shot collected in the hoppers shall be substantially uniform so that regardless of whether the jet nozzles are at their upper or lower positions, the head of shot within the hopper 71 may be maintained substantially constant. For this reason, as can be seen from FIG. 8 for instance, there is a break between the end of the outlet connection 237 and the upper portion of the hopper. In this way, the shot falls freely into the hopper but the head is determined by the shot level within the hopper. In order to better control the level of the shot within the hopper 71, it is frequently desirable to provide wall openings shown schematically at 253 so that if the shot level tends to rise beyond a calculated height, the overflow will pass through the wall opening and eventually fall to the receiving bin at the bottom of the unit later to be again recirculated. In order that the jet nozzles may be oriented as desired, the collar and clamp arrangements 209 may be provided for either or both vertical and horizontal motion and the attachment to the support bracket 208 may be controlled in various fashions.

Various and further modifications may be made without departing from the spirit and scope of what is herein described.

Having now described the invention, what is claimed is:

1. Apparatus for peening a component held upon a support structure comprising
   a peening rig,
   means to support the rig adjacent to and upon the component,
   means to provide relative movement between the component and the rig,
   jet means supported upon the rig for positioning also substantially adjacent to and directed toward the component,
   means to supply peening shot and a gaseous fluid to the jet means for ejecting shot at high velocity from the jet to impact the component,
   drive means for moving the jet means transversely of the component in a reciprocating fashion simultaneously with relative rotational movement between the rig about the component,
   closure means for housing the rig, and
   means for controlling the head at which the shot is supplied to the jet means whereby with substantially constant fluid pressure the ejecting velocity of the shot from the jet means remains substantially constant at all component and jet positions.

2. Apparatus for peening a metal body component comprising
a peening rig supported adjacent to the body,
shot-ejecting jet means supported upon the rig and also positioned substantially adjacent to the body,
hopper means for supplying shot to the jet means,
means to maintain substantially the same supply head of shot from the hopper,
said shot-ejecting means comprising a nozzle and having a chamber associated therewith into which the hopper is adapted to feed shot at substantially a constant shot pressure head,
means to supply fluid at substantially constant pressure to the jet means for ejecting the shot therefrom toward the body,
means for establishing relative movement in two directions between the rig and the metal body whereby all body surface areas are transversed by the jet means,
and said means provides for moving the jet means in a reciprocating fashion transversely of the path of relative movement between the rig and the body so that bi-dimensional areas of the body are within the field of shot ejection from the jet means.

3. The apparatus of claim 2 wherein the jet means comprise
a plurality of nested nozzle elements each directed to substantially a common point.

4. The apparatus claimed in claim 3 comprising, in addition,
means to nest the jet means in a group of ejection nozzles whereby ejected shot from the jets are directed at any instant to reach and impact substantially a single common point on the component to be peened.

5. The apparatus claimed in claim 4 comprising, in addition,
means to control the limit of the reciprocational movement of the jet means in the path transverse to the component adapted to be subjected to shot peening by jet action.

6. The apparatus claimed in claim 2 comprising, in addition,
a pair of guide arms extending outwardly from the peening rig,
means to align the arms thereby to bring an assumed projection thereof to substantially intersecting relationship at approximately the center of the component adapted to be subjected to the peening action,
and roller means included on the arms for supporting the rig adjacent to the component to be peened.

7. The apparatus claimed in claim 6 comprising, in addition,
means to rotate the support rollers thereby to rotate the peening rig about the component to be peened.

8. The apparatus claimed in claim 2 comprising, in addition,
a plurality of separate outlet jets in the jet means,
a supply hopper for each jet,
means to supply shot to each hopper from a common source, said supply means terminating in a position removed from the hoppers, whereby the supplied shot reaches the hoppers gravitationally and the pressure head developed at the jet is due substantially only to the hopper contents.

9. The apparatus claimed in claim 8 comprising, in addition,
collection means for gathering shot ejected from the plurality of jets subsequent to its contact with the component to be peened, and
elevating means for recirculating the shot and supplying said shot to the hoppers.

10. The apparatus claimed in claim 9 wherein the fluid supplied to the jets is delivered as air under pressure and wherein the supplied air through the jets aids in withdrawing the shot from the supply hopper.

11. The apparatus claimed in claim 2 comprising, in addition, means to maintain substantially constant each of the relative movement between the nozzle jet means and the component toward which the nozzle jet means are directed and the rate at which the nozzle jets moves transversely of the component toward which they are directed.

12. The apparatus claimed in claim 11 wherein the relative speed between the component and the nozzle jet means is substantially constant within any unit time period, and
means to change the speed between pre-set limits.

13. The apparatus claimed in claim 1 comprising, in addition,
brush means secured to the rig for removing peening dust from the component thereby to provide for housing closure, and
means for recirculating the peening shot subsequent to use.

14. A jet-positioning assembly for securement to a driving V belt, comprising
a frame including a pair of elongated guide members and
a pair of connecting cross members to form a substantially rectangular assembly having its opposite sides parallel,
means on the guide members for locating and guiding the frame to reciprocate along a selected path,
means on the cross members for supporting a plurality of jet nozzles for directing peening shot in controlled paths,
a plurality of motion-transmitting guide plates,
means to secure each of the guide plates to the frame,
a clamping plate associated with each guide plate, the guide plates and clamping plates being adapted to be positioned on opposite sides of the driving V belt, and
a yoke means for securing the clamping and guide plates to each other and to the V belt so that belt movement is transmitted therethrough to the frame.

15. The assembly claimed in claim 14 comprising, in addition,
drive means for the V belt, and
means connected to the frame for reversing the direction of drive at the end of each movement path of the frame over an allotted stroke length.

References Cited

UNITED STATES PATENTS

| | | | |
|---|---|---|---|
| 2,489,877 | 11/1949 | Fowler | 29—90.80 |
| 2,701,408 | 2/1955 | Borger | 72—53 |
| 2,968,086 | 1/1961 | Fuchs I | 72—53 |
| 2,982,007 | 5/1961 | Fuchs II | 72—53 |

FOREIGN PATENTS 970,120   8/1958   Germany.

CHARLES W. LANHAM, *Primary Examiner.*

G. P. CROSBY, *Assistant Examiner.*

U.S. Cl. X.R.

51—319